Aug. 16, 1932.   F. G. HODELL   1,871,521

STOCK TIRE CHAIN

Filed Aug. 23, 1930

INVENTOR
Frederick G. Hodell

BY
Brockett, Hyde, Higley & Meyer
ATTORNEYS

Patented Aug. 16, 1932

1,871,521

UNITED STATES PATENT OFFICE

FREDERICK G. HODELL, OF CLEVELAND HEIGHTS, OHIO, ASSIGNOR TO THE CHAIN PRODUCTS COMPANY, OF CLEVELAND, OHIO, A CORPORATION OF OHIO

STOCK TIRE CHAIN

Application filed August 23, 1930. Serial No. 477,221.

This invention relates to non-skid tire chains and more particularly to a stock tire chain in multiple unit form from which a plurality of individual or unit non-skid tire chains may be produced.

The object of the invention is to provide an improved multiple unit stock tire chain which for the most part is of usual ladder form adapted for sub-division to produce a plurality of unit or individual non-skid tire chains, but which in addition is provided with surplus blank lengths of side chains free of cross connection to each other and thereby adapted to be connected at the usual regular intervals by cross chains made available for that use as the result of the sub-division of the main body of ladder form chain, as hereinafter referred to, thereby putting to use the surplus cross chains as parts of additional unit or individual non-skid tire chains, and with advantages which will appear more fully hereafter.

Further objects of my invention are in part obvious and in part will appear more in detail hereinafter.

Figure 1:
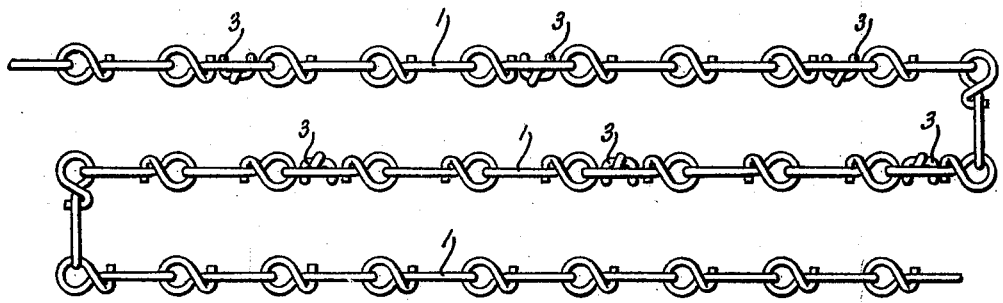
Figure 2:
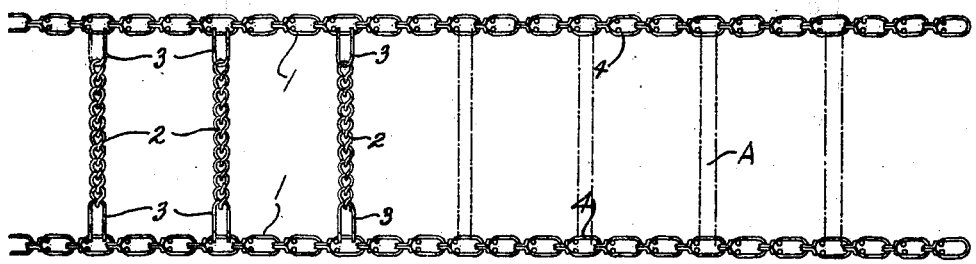
Figure 3:
Figure 4:

In the drawing which represents one suitable embodiment of the invention, Fig. 1 is a side view of a portion of the length of a stock tire chain constructed according to my invention; Fig. 2 is a plan view thereof; Fig. 3 is a view of one cross chain and Fig. 4 is a view of a fastening device.

One modern system of merchandising non-skid tire chains is fully set forth in an application for sales cabinet for tire chains, filed March 6, 1926, by Howard Wilcox, Serial No. 92,775, to which reference may be had for a more complete description, if desired. The local dealer is supplied by the manufacturer with lengths of stock chain of ladder form each long enough for sub-division into several individual or unit non-skid chains. The stock chain, for example, may be 100 feet long and if the total length of the individual or unit non-skid chain is 8 feet, twelve individual non-skid chains may be produced therefrom. The ladder form chain consists of the usual two parallel side chains connected at more or less regular intervals by cross chains of any suitable or desirable form. These cross chains are spaced along the side chains at different distances according to the size of tire, etc., and may be separated, for example, at intervals anywhere from three to nine or ten inches. The finished non-skid chain at each end, beyond the last cross chain, is provided with free extended lengths of side chain, suitable fasteners of any type, such as is shown in Fig. 4 of the drawing, being connected to the side chains at one end, the free extended lengths of side chain being necessary to adapt the non-skid chain to its tire in accordance with variances in size and in pressure in the tire, etc.

To provide the aforesaid free extended lengths of side chain when a non-skid tire chain unit is cut off from a length of stock chain, it is necessary to remove one or more cross chains from the zone where the long length of stock chain is severed. These removed cross chains collect and more often than not are a total loss for lack of demand for individual cross chains.

The present invention provides a stock chain which takes account of these surplus removed cross chains and supplies a way in which they can be put to use to avoid waste. The stock chain of my invention is made in any suitable lengths, but, as before, in lengths suitable for sub-division into several individual or unit non-skid chains. For example, the stock chain may be 100 feet, more or less, in length. It comprises, as before, two parallel side chains 1 connected at more or less regular intervals by any suitable form of cross chains 2 which are provided at their ends with hooked members 3 designed to be hooked into and thereby secured to the links of the side chain. However, the present stock chain is provided with extra lengths of blank side chains which are free of direct connection to each other by cross chains as in the body or main portion of the stock chain. These extra lengths of side chains may be located at any point or points in the total length of the stock chain. They may be between its ends or at either end, because the important point is not the particular location of the extra lengths or surplus of side chains, but the provision of such a surplus adapted for connection by cross chains to produce extra unit or individual non-skid chains, as described. The extra or surplus lengths of side chains are marked 4 in the drawing and are located at one end of the stock chain as a whole, although this is not essential.

Of course, the end fasteners, such as shown in Fig. 4, are supplied to the dealer in loose or unconnected form and are applied by the dealer to the unit or non-skid chains as the latter are produced.

With this stock chain, the dealer cuts off a length of the stock chain suitable for the size of non-skid chain he is about to produce. To provide the necessary free extended length of side chain at the end, for adjustment to the tire, as described, he takes out or removes one or two cross chains, as may be necessary. He then attaches fasteners, such as in Fig. 4, to the ends of the side chains and the non-skid chain is completed.

In this manner the dealer goes on, producing non-skid chains one after the other and in each case taking out one or two cross chains so that in time the latter collect in quantity sufficient for use. These surplus cross chains are then inserted between the surplus lengths of blank side chain 4 to connect the same in the manner indicated by the dotted lines A, Fig. 2, so that formerly unconnected or blank extensions 4 of the side chains now become of like form with the main body of the stock chain and suitable for sub-division into non-skid chains in the usual manner. Of course, when the stock chain as a whole is used up to the point of reaching the ends of its side chains, a new stock chain is connected to it by fastening the ends of the side chains of the two stock chains together.

With this arrangement, by providing each stock chain with blank or unconnected portions of its side chains which are of a length suitable to receive and use the average number of cross chains made available by the sub-division of the main body of the stock chain, all cross chains are put to use and no waste is entailed. As a result, the cost of each individual or unit non-skid chain to the user is reduced.

What I claim is:

1. A stock tire chain, comprising parallel side chains connected at intervals by cross chains and of sufficient length for sub-division to form several individual non-skid chains, said side chains being provided with surplus blank or unconnected portions adapted for connection by cross chains available as the result of sub-division of the main body of the stock chain.

2. A stock tire chain comprising a pair of relatively long spaced side chains disposed in substantially parallel relation to each other and a plurality of spaced cross members disposed substantially parallel to each other and serving to connect said side chains together, the said side chains being interconnected by said cross members throughout the greater portion of their length but being free of said cross members for the remainder of their length whereby cross members removed from the portion of the stock chain provided therewith in severing individual tire chains therefrom may be applied to said portion free of cross members to provide an additional length of stock tire chain.

3. A stock tire chain comprising a pair of relatively long spaced side chains disposed in substantially paralled relation to each other and a plurality of spaced cross members disposed substantially parallel to each other and serving to connect said side chains together, the said side chains being interconnected by said cross members at intervals throughout the length thereof and being free of said cross members at other intervals throughout the length thereof whereby cross members removed from the portions of the side chains provided therewith in severing individual tire chains may be applied to the portions free of said cross members to provide additional lengths of stock tire chain.

In testimony whereof I hereby affix my signature.

FREDERICK G. HODELL.